United States Patent [19]
Bundy

[11] Patent Number: 5,501,475
[45] Date of Patent: Mar. 26, 1996

[54] UNIVERSAL STAINLESS STEEL TRUCK STEP AND ADJUSTABLE SUPPORT ROD

[75] Inventor: Don Bundy, Sapulpa, Okla.

[73] Assignee: Mid-America Automotive, Inc., Sapulpa, Okla.

[21] Appl. No.: 282,977

[22] Filed: Jul. 29, 1994

[51] Int. Cl.$^6$ ........................................ B60R 3/00
[52] U.S. Cl. ..................... 280/166; 182/92; 182/127; 182/228; 280/163; 280/169
[58] Field of Search ..................... 280/163, 169, 280/164.1, 164.2, 166; 296/75, 62; D12/203; D25/69; 52/179; 182/55, 57, 62, 90, 92, 127, 228

[56] References Cited

U.S. PATENT DOCUMENTS

| | | | |
|---|---|---|---|
| D. 158,136 | 4/1950 | Simon | D12/203 |
| D. 257,250 | 10/1980 | Stoltenberg et al. | D12/203 |
| 2,601,888 | 7/1952 | Schopper | 182/92 |
| 2,787,036 | 4/1957 | Mermer | 52/179 |
| 3,758,134 | 9/1973 | Stewart | 280/163 |
| 4,159,122 | 6/1979 | Stevens | 280/166 |
| 4,721,319 | 1/1988 | Dale | 182/92 |
| 4,753,447 | 6/1988 | Hall | 280/163 |
| 5,139,296 | 8/1992 | Bundy | 293/117 |

*Primary Examiner*—Anne Marie Boehler
*Attorney, Agent, or Firm*—Molly D. McKay

[57] ABSTRACT

A combination stainless and mild steel step having universal brackets and adjustable support rods for mounting the step onto a pickup truck. The step is provided with a mild steel plate having a back edge to which an upwardly projecting stainless steel backplate is welded and also having a front and two side edges to which a downwardly projecting stainless steel perimeter lip is welded. L-shaped support braces and attachment members are welded to a bottom surface of the step as a means for attaching the step to the pickup via, respectively, the universal brackets and adjustable support rods. The top plate and all of the welds are concealed by a plastic cap which secures to a top surface of the plate and which may be provided with traction grids to provide non-slip footing.

8 Claims, 3 Drawing Sheets

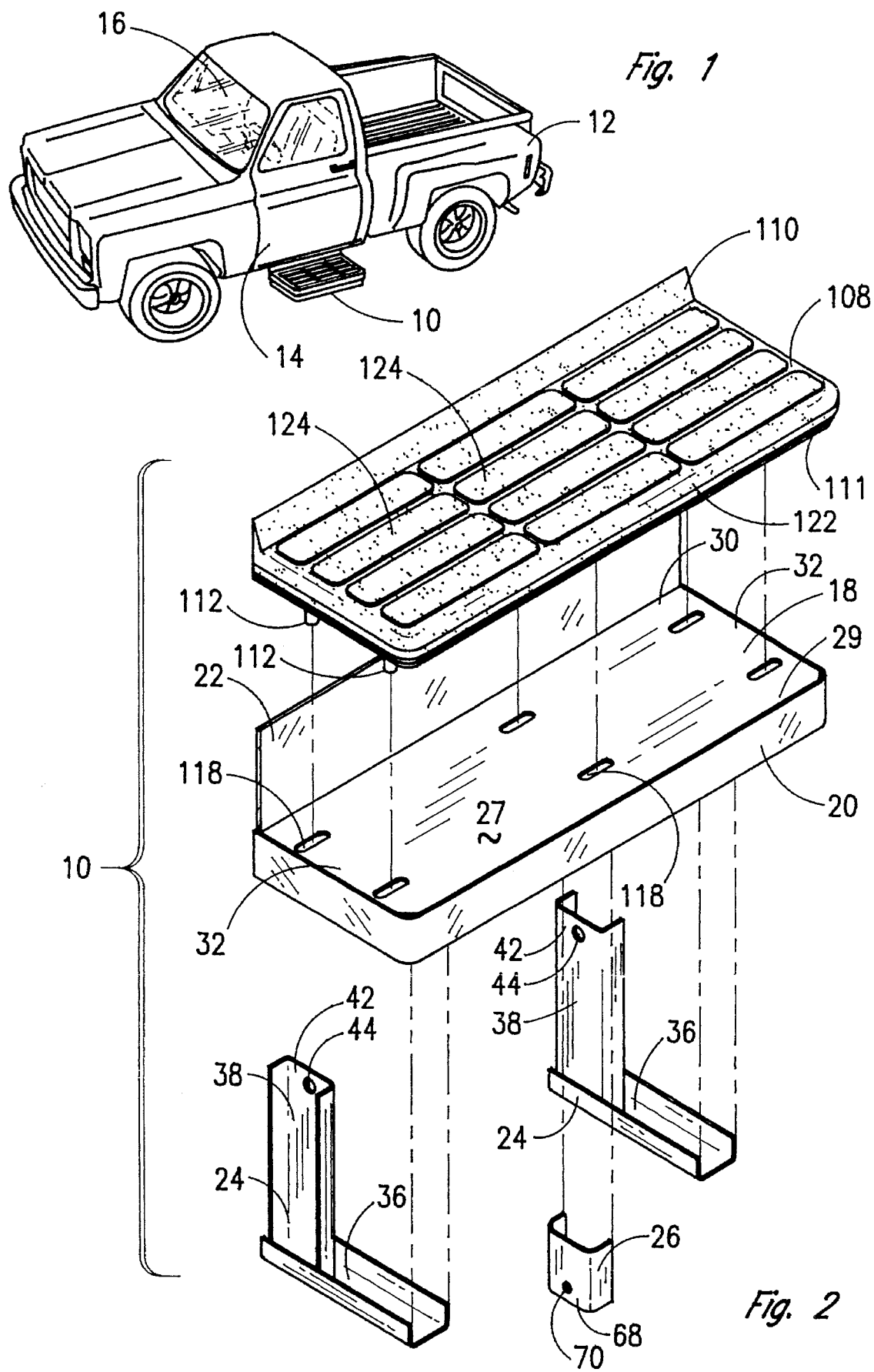

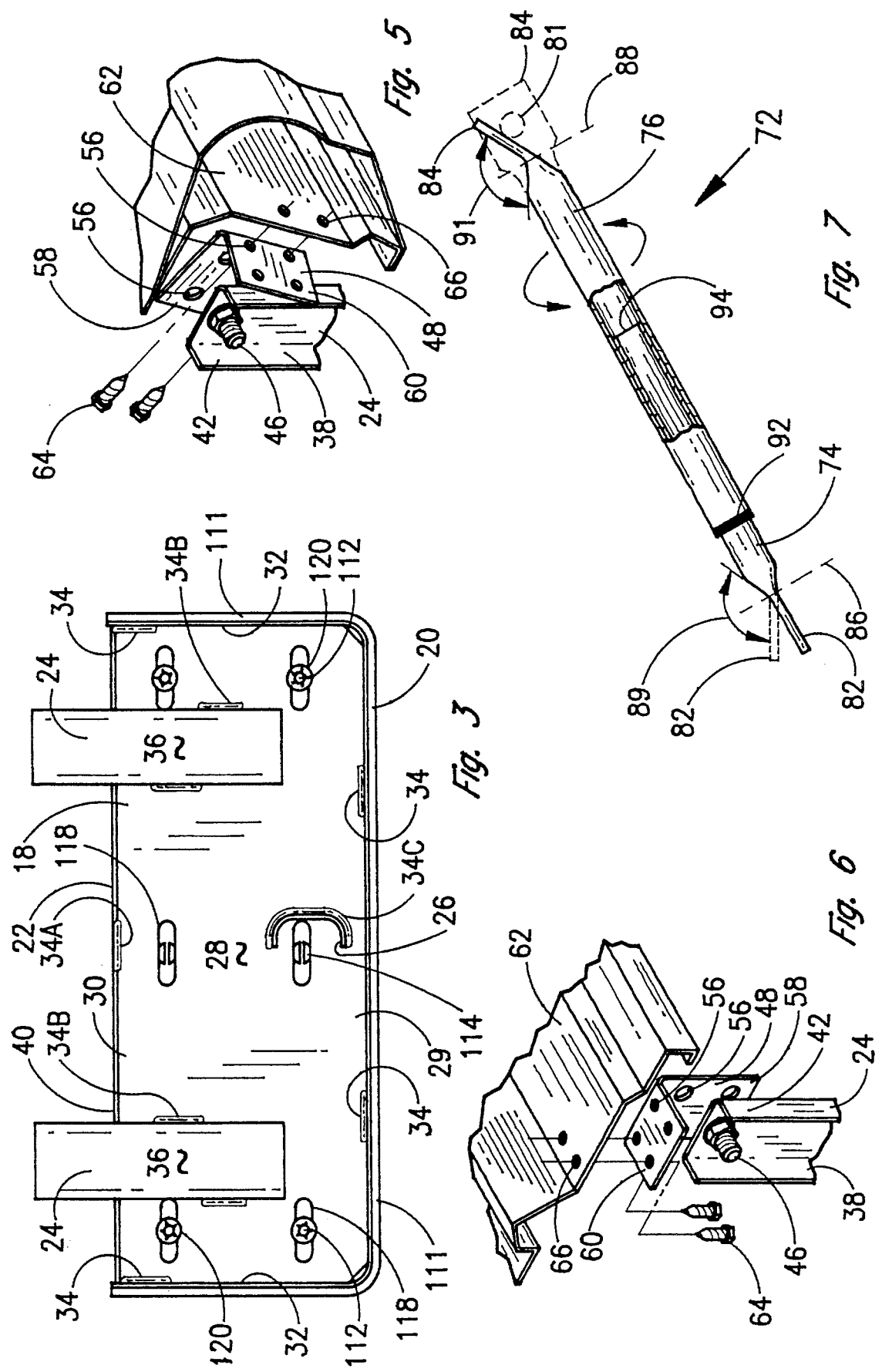

5,501,475

UNIVERSAL STAINLESS STEEL TRUCK STEP AND ADJUSTABLE SUPPORT ROD

BACKGROUND OF THE INVENTION

1. Field of the Invention

The invention relates to a stainless steel step mountable to the frame of a pickup truck on the exterior of and below a door of the truck by means of a universal bracket and an adjustable support rod. More specifically, the invention relates to a step constructed of a combination of stainless steel and mild steel which can be securely mounted to the frame on any type of truck. The invention also includes a universal bracket and a telescoping support rod with ends which can be bent to conform to the frame of the truck and to the step as means to secure the step to the truck.

2. Description of the Related Art

Today's new vehicles normally are not provided with exterior steps. Therefore, many pickup truck owners add steps to their trucks just below either the driver's side door or the passenger's side door, or below both these doors. The reasons for adding steps to a truck include both functional and aesthetic considerations.

Steps make entering the truck's cab easier, particularly for very young or old people, for individuals having short legs, and for person's wearing garments, such as tight skirts, which restrict the height which the individual's leg and foot may be raised in order to step into the cab. Therefore, the steps must be strong in order to support the weight of a person as he or she enters and exits the cab. Strictly from a standpoint of strength, the ideal material for constructing a truck step would be mild or carbon steel. However, steps constructed of mild steel are generally not very attractive, even if painted, and the carbon steel will eventually rust from the moisture it is exposed to in this service. Thus truck steps constructed of carbon steel are not very popular with truck owners.

On the other hand, from a purely aesthetic standpoint, truck steps constructed of stainless steel are most attractive. Additionally, stainless steel truck steps remain attractive for years because stainless steel does not rust like mild steel when exposed to the elements. However, stainless steel is a more expensive material than mild steel. Also stainless steel is difficult and costly to shape into the proper configuration to form a truck step and to polish after being properly formed. In order to reduce the cost of their product and thereby make their product more cost competitive in the marketplace, some manufacturers of truck steps have reduced the thickness of the stainless steel used in constructing their steps and have reduced support structures employed to secure the steps to the truck frame. As a result of such changes, these stainless steel truck steps, although quite attractive, are essentially non-functional because they are so structurally weak that they cannot bear the weight of an individual without bending or breaking completely off the vehicle.

The present invention addresses these problems by providing a truck step which combines the strength of carbon steel, the beauty and rust resistance of stainless steel. The present invention is inexpensive to produce and utilizes unique universal brackets and adjustable support rods in order to securely mount the step to any pickup truck frame.

SUMMARY OF THE INVENTION

The present invention is a truck step composed of a rectangular mild steel plate having top and bottom surfaces; and having front, back, and two side edges. A stainless steel perimeter lip attaches via welds to the front and side edges and extends downward therefrom. A stainless steel backplate attaches via welds to the back edge and extends upward therefrom.

A lower leg of each of at least two L-shaped support braces attaches to the bottom surface of the plate via welds, and the opposite upper leg of each brace extends upward beyond the backplate. A distal end of the upper leg is provided with openings for securing the brace to a universal bracket. The universal bracket is L-shaped and is provided with a plurality of holes in both its proximal and distal legs for securing the bracket by its proximal leg to the support brace via bolts and by its distal leg to a frame of a pickup truck via screws.

At least one mild steel attachment member attaches to the bottom surface of the plate at a location adjacent to the front edge. The attachment member attaches to the bottom surface via welds and extends downward therefrom. Each attachment member has associated with it an adjustable support rod. Each adjustable support rod is comprised of a smaller rod and a larger rod which slidably receives the smaller rod in telescoping fashion. A distal end of the attachment member is provided with a hole for attaching the distal end by means of a bolt to one end of the adjustable support rod via a hole provided therein.

The opposite end of the support rod is also provided with a hole for attaching the support rod to an opening in a frame of the truck by means of a bolt which secures within the hole and the opening.

A plastic cap which is provided with front and rear lips secures to the top surface of the plate so that a bottom surface of the cap abuts the plate's top surface and so that the entire plate and all welds are concealed underneath the cap. The bottom surface of the cap is provided with projections, self-fastening clips, or other suitable fastening devices which insert through mating slots provided in the plate. The projections are secured in the slots by means of tension clips which attach to the projections as they protrude downward from the plate's bottom surface. Alternately or additionally, self-fastening clips which may be employed will spring outward after being inserted through their associated mating slot, thereby securing the cap to the plate without the use of tension clips.

The cap is optionally provided with traction grids on its top surface which improve traction when the cap becomes wet.

BRIEF DESCRIPTION OF THE DRAWINGS

FIG. 1 is a perspective view of a universal stainless steel truck step constructed according to a preferred embodiment of the present invention shown secured onto a pickup truck below the driver's side door.

FIG. 2 is an exploded view of the stainless steel truck step of FIG. 1, shown without its universal brackets and support rod.

FIG. 3 is a bottom plan view of the step of FIG. 2.

FIG. 5 is a cut-away view illustrating attachment of the step to one type of rocker panel by means of the universal bracket.

FIG. 6 is a cut-away view illustrating attachment of the step to a second type of rocker panel by means of the universal bracket.

FIG. 7 is a partially cut away side view of the adjustable support rod.

DETAILED DESCRIPTION OF THE PREFERRED EMBODIMENT

Figure 4:
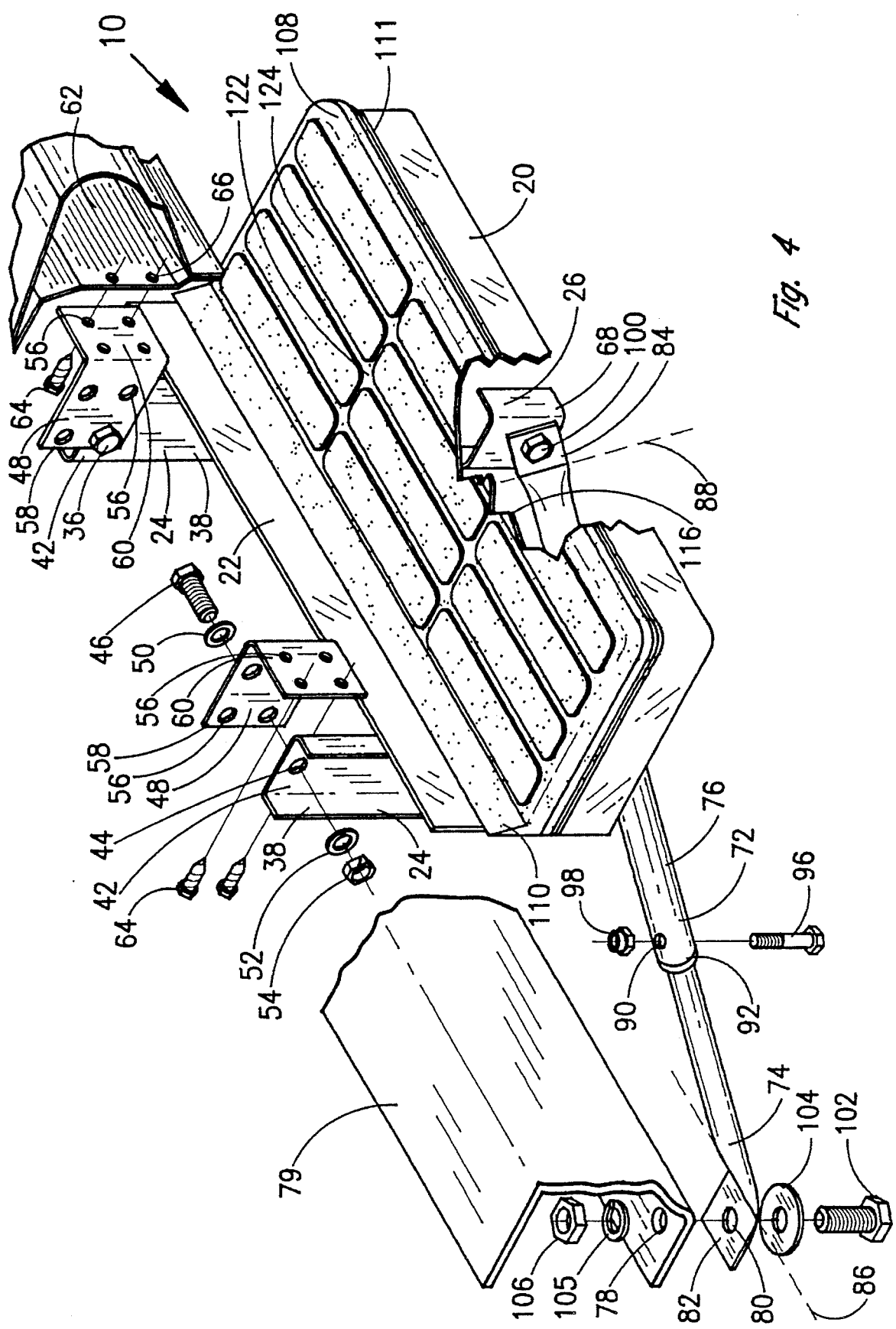
FIG. 4 is a perspective view of a partially cut away step shown with its universal brackets and support rod, illustrating attachment of the step to a truck frame and bottom rocker panel.

Referring now to FIG. 1, there is illustrated a universal stainless steel step 10 constructed according to a preferred embodiment of the present invention. The step 10 can be secured to a pickup truck 12 or other suitable vehicle adjacent to and just below a door 14 for entering a passenger compartment or cab 16 of the truck 12.

Referring now to FIGS. 2 and 3, the step 10 is constructed of a flat plate 18, a perimeter lip 20, and a backplate 22, at least two L-shaped support braces 24, and at least one attachment member 26. The flat plate 18, the braces 24, and the attachment member 26 are preferably constructed of mild steel. The perimeter lip 20 and the backplate 22 are preferably constructed of some type of stainless steel, for example, 304 stainless steel. The flat plate 18 is horizontal and rectangularly shaped. The plate 18 is provided with a top surface 27, bottom surface 28 opposite the top surface 27, a front edge 29, a back edge 30 opposite the front edge, and two side edges 32 located opposite each other and generally perpendicular to the front and back edges 29 and 30.

The perimeter lip 20 attaches to and extends downward from the front edge 29 and the two side edges 32. The perimeter lip 20 attaches to the front and side edges 29 and 32 of the top 18 by means of welds 34 or other suitable attachment means. Likewise the backplate 22 attaches to and extends upward from the back edge 30 of the plate 18 and is attached thereto by means of welds 34A or other suitable attachment means.

Referring now also to FIG. 4, a lower leg 36 of each L-shaped support brace 24 attaches to the bottom surface 28 of the flat plate 18 by means of welds 34B or other suitable attachment means. An upper leg 38 of each L-shaped support brace 24 abuts the back edge 30 and a backside 40 of the backplate 22. A distal end 42 of the upper leg 38 extending above the backplate 22. Each distal end 42 is provided with an opening 44 through which a bolt 46 inserts to secure a universal bracket 48 to the brace 24. A washer 50, a lock washer 52, and a nut 54 are used with each bolt 46 to secure the bracket 48 to the brace 24. Each bolt 46 enters one of a plurality of holes 56 provided in both proximal and distal legs 58 and 60 of the L-shaped universal bracket 48. As illustrated in FIGS. 5 and 6, hole 56 located in the proximal leg 58 of the bracket 48 is chosen so that the bracket 48 can be positioned with its distal leg 60 abutting a rocker panel 62 of the pickup truck. Self-threading screws 64 or other suitable fastening means extend through holes 56 located in the distal leg 60 in order to secure the distal leg 60 to the rocker panel 62 via openings 66 which have been either created in the rocker panel 62 by the self-threading screws 64 or predrilled in the rocker panel 62.

Each attachment member 26 secures by means of welds 34C or other suitable attachment means to the bottom surface 28 of the flat plate 18 adjacent the front edge 29 so that a distal end 68 of the attachment member 26 extends downward from the bottom surface 28. The distal end 68 is provided with a hole 70.

As illustrated in FIGS. 4 and 7, the support rod 72 is comprised on one end of a smaller rod 74 and on the other end of a larger rod 76 so that the large rod 76 slidably receives the smaller rod 74 in telescoping fashion. First, an opening 78 is located in a frame 79 of the pickup truck 12 such that the opening 78 is suitable for attachment of one end of the support rod 72. Next the smaller rod 74 is slid inward or outward relative to the larger rod 76 in order to adjust the support rod 72 to the proper length so that a hole 80 provided in the end 82 of the support rod 72 aligns with the opening 78 in the frame 79 and a hole 81 provided in the end 84 of the support rod 72 aligns with the hole 70 provided in the attachment member 26.

In order to properly align hole 80 with opening 78 and align hole 81 with hole 70, the ends 82 and 84 may need to be twisted relative to each other. This is accomplished by turning the smaller rod 74 relative to the larger rod 78 as illustrated by the arrows in FIG. 7. Also in order to properly align hole 80 with opening 78 and hole 81 with hole 70 so that end 82 lies flush against the frame 79, for example as illustrated in FIG. 4, and end 84 lies flush with the attachment member 26, the ends 82 and 84 may need to be bent in relationship to the support rod 72.

The support rod 72 is preferably constructed of a material such as plated mild steel tubing such as used for electrical conduit so that distal ends 82 and 84 of the rods 74 and 76 can be bent along weakened lines 86 and 88 respectively. In order to bend either of the ends 82 or 84, the end, either 82 or 84, is first firmly grasped with an appropriate tool (not illustrated) and then pressure is applied to the support rod 72 to cause the end, either 82 or 84, to bend at the line, either 86 or 88. Pressure is applied until a proper angle, 89 or 91, is achieved between the end, either 82 or 84, and the support rod 72. Once the support rod 72 is properly adjusted, a hole 90 is drilled through a proximal end 92 of the larger rod 76 so that the hole 90 also extends through a proximal end 94 of the smaller rod 74 located inside the larger rod 76. A support rod bolt 96 is inserted through the hole 90 and is secured therein with a support rod nut 98, thus permanently holding the support rod 72 in a properly adjusted configuration.

The support rod 72 is then secured to the attachment member 26 by placing attachment member bolt 100 through hole 81 and hole 70 and securing the bolt 100 therein by means of a nut (not illustrated).

The support rod 72 is finally secured to the frame 79 by placing frame bolt 102 first through a frame washer 104, then consecutively through hole 80, opening 78, and a frame lock washer 105. The frame bolt 102 is secured therein by means of a frame nut 106.

A cap 108 constructed of plastic or other suitable material secures over the top surface 27 of plate 18 to conceal the plate 18 and any traces of the welds 34, 34A, 34B, and 34C which would normally be visible on the step 10. In order to attain proper coverage, the cap 108 is provided with a rear lip 110 which extends upward along the entire back edge 30 of the plate 18 and a front lip 111 which extends downward along the entire front and side edges of the plate 18. The rear lip 110 extends upward only far enough to conceal the plate 18 and welds 34A and does not cover the entire back plate 22. Likewise the front lip 111 extends downward only far enough to conceal the plate 18 and welds 34 and does not cover the entire perimeter lip 20. The cap 108 covers the entire top surface 27 of the plate 18, thus concealing traces of weld 34B and 34C which would otherwise be visible on the top surface 27.

The cap 108 secures to the top surface 27 of the plate 18 by means of projections 112, self-fastening ears 114, or other suitable fastening devices (not illustrated) provided on a bottom surface 116 of the cap 108. The projections 112, self-fastening ears 114, or other suitable fastening devices insert through mating slots 118 provided in the plate 18. Once inserted through a slot 118, each projection 112 is secured therein by means of a tension clip 120. Where self-fastening ears 114 are employed, each of the self-fastening ears 114 springs outward upon passing through its mating slot 118 and thereby secures the cap 108 to the plate 18 without use of tension clips 120.

The cap 108 is provided with a top surface 122 which optionally may be provided with a plurality of traction grids 124 in order to provide non-slip footing for the step 10 during inclement weather.

Although the step 10 has been described in relationship to use with a pickup truck 12, its use is not so limited, and the step 10 may be used with any type of vehicle.

While the invention has been described with a certain degree of particularity, it is manifest that many changes may be made in the details of construction and the arrangement of components without departing from the spirit and scope of this disclosure. It is understood that the invention is not limited to the embodiment set forth herein for purposes of exemplification, but is to be limited only by the scope of the attached claim or claims, including the full range of equivalency to which each element thereof is entitled.

What is claimed is:

1. A universal step for a vehicle comprising:

a horizontal plate, a perimeter lip being secured to and extending downward from a front and side edges of said plate, a backplate being secured to and extending upward from a back edge of said plate, a cap being secured over said plate such that said plate is concealed by said cap, at least one L-shaped brace, one leg of each brace being secured to a bottom surface of said plate, a second leg of each L-shaped brace being secured to a proximal end of a universal bracket, a distal end of said universal bracket being provided with means for securing said universal bracket to said vehicle, an adjustable support rod, said support rod being comprised of a smaller rod and a larger rod, a proximal end of said larger rod receiving a proximal end of said smaller rod in telescoping manner, means for securing said smaller rod within said larger rod, a first end of said support rod being provided with means for securing said first end to said vehicle, a second end of said support rod being provided with means for securing said second end to said plate.

2. A step of claim 1 wherein said means for securing said smaller rod within said larger rod is a bolt which inserts and secures within a hole created in said larger and smaller rods.

3. A step of claim 1 wherein said means for securing said first end to said vehicle is a bolt which inserts and secures within a hole provided in said first end and within an opening in a frame of said vehicle.

4. A step of claim 1 wherein said means for securing said second end to said plate comprises a bolt which inserts and secures within a hole provided in said second end and within a hole provided in an attachment member attached to said bottom surface of said plate.

5. A step of claim 1 wherein each said end of said support rod is provided with a weakened line along which said end may be bent.

6. A step of claim 5 wherein said support rod is constructed of mild steel tubing.

7. A universal step for a vehicle comprising a plate, a perimeter lip being attached to and extending downward from a front and two side edges of said plate, a backplate being attached to and extending upward from a back edge of said plate, a cap being attached over said plate such that said plate is concealed by said cap, at least one brace being secured to a bottom surface of said plate, a universal bracket removably securable to each said brace, each said universal bracket removably securable to a vehicle, at least one attachment member being secured to the bottom surface of said plate, an adjustable support rod being provided for each said attachment member, each said support rod being provided with two ends, one said end being removably secured to said attachment member, and the other said end being removably secured to said vehicle.

8. A step of claim 7 wherein said plate and each brace and each attachment member are constructed of mild steel and wherein said perimeter lip and said backplate are constructed of stainless steel.

* * * * *